April 21, 1936.   E. P. BONE   2,038,409
DISPLAY SIGN
Filed Aug. 24, 1931   5 Sheets-Sheet 1
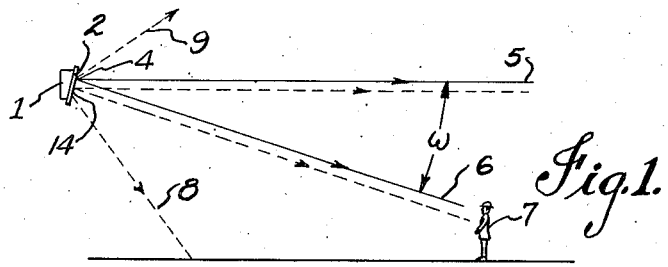
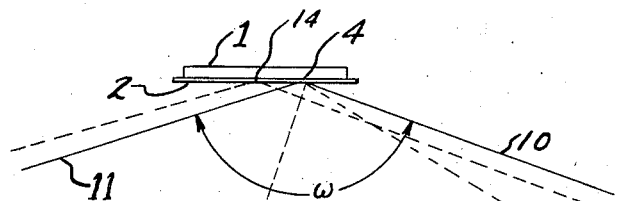
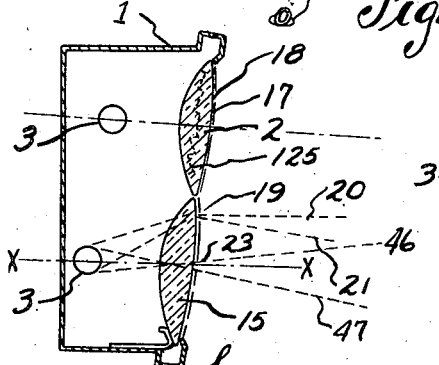
INVENTOR.
Evan P. Bone
BY
ATTORNEYS April 21, 1936. E. P. BONE 2,038,409
DISPLAY SIGN
Filed Aug. 24, 1931 5 Sheets-Sheet 2

INVENTOR.
Evan P. Bone
BY
ATTORNEYS

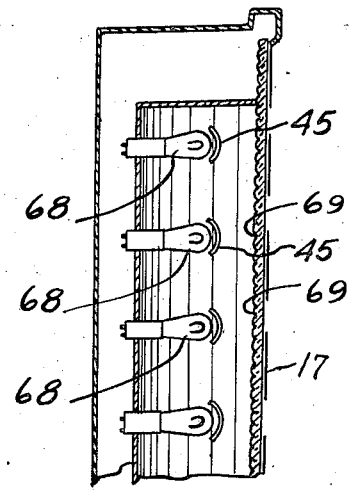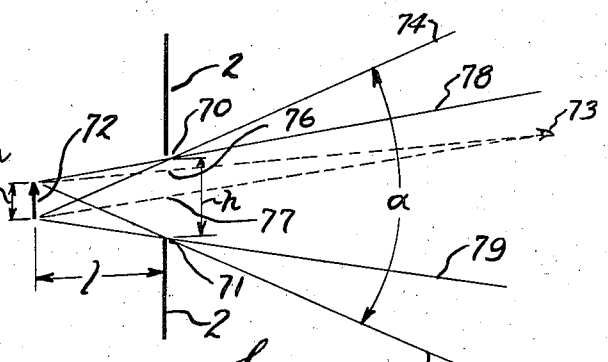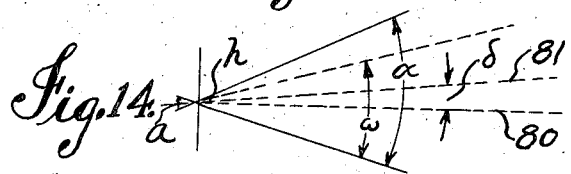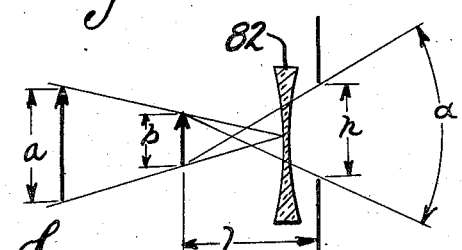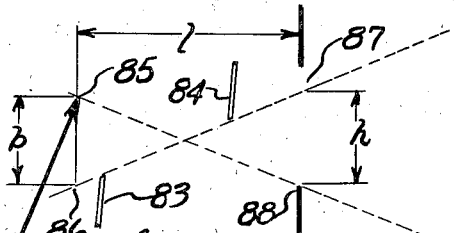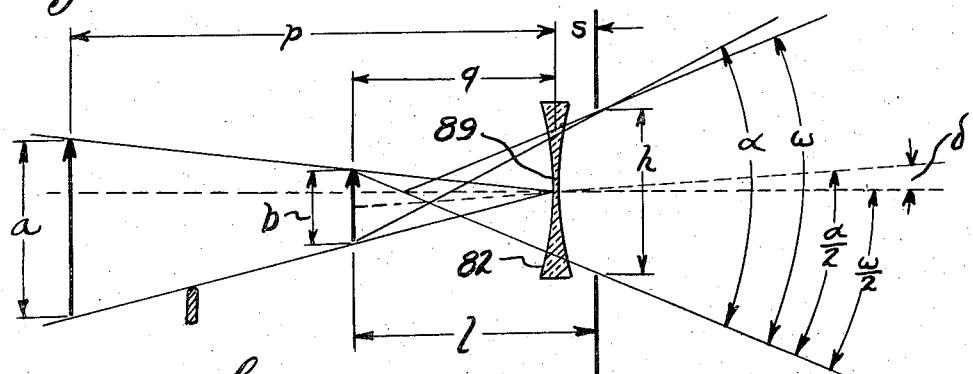

April 21, 1936.  E. P. BONE  2,038,409
DISPLAY SIGN
Filed Aug. 24, 1931   5 Sheets-Sheet 4

INVENTOR.
Evan P Bone
BY
Allen Allen
ATTORNEY.

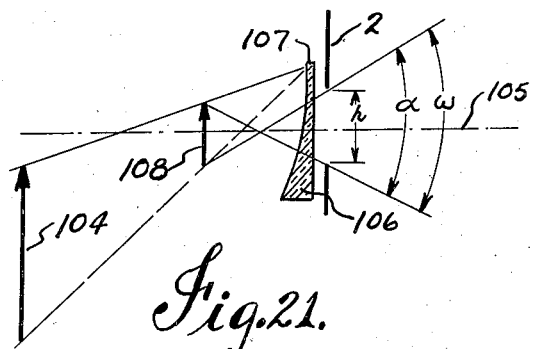
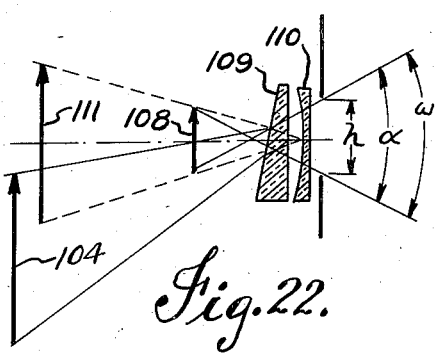
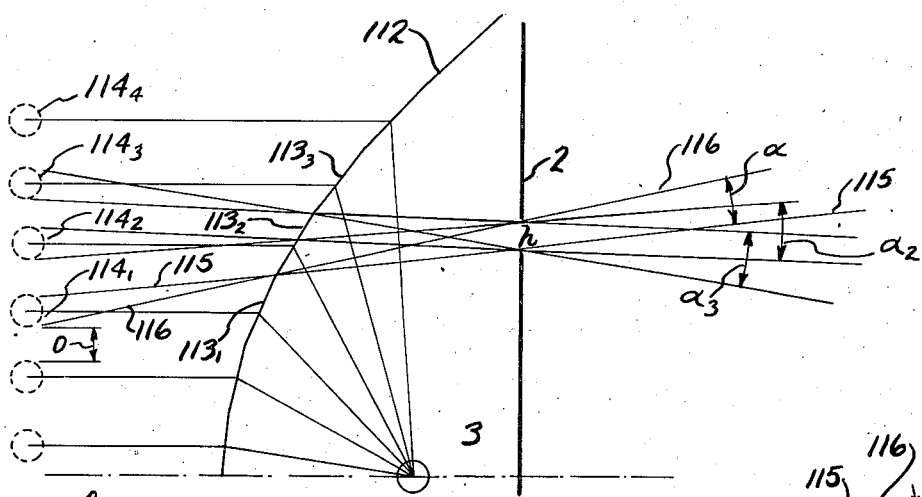
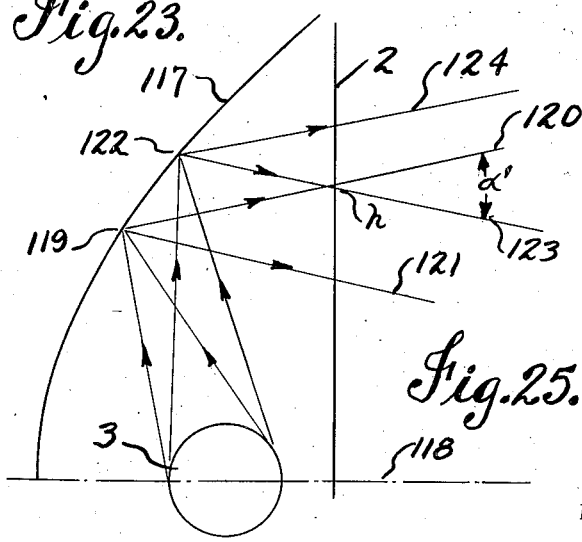
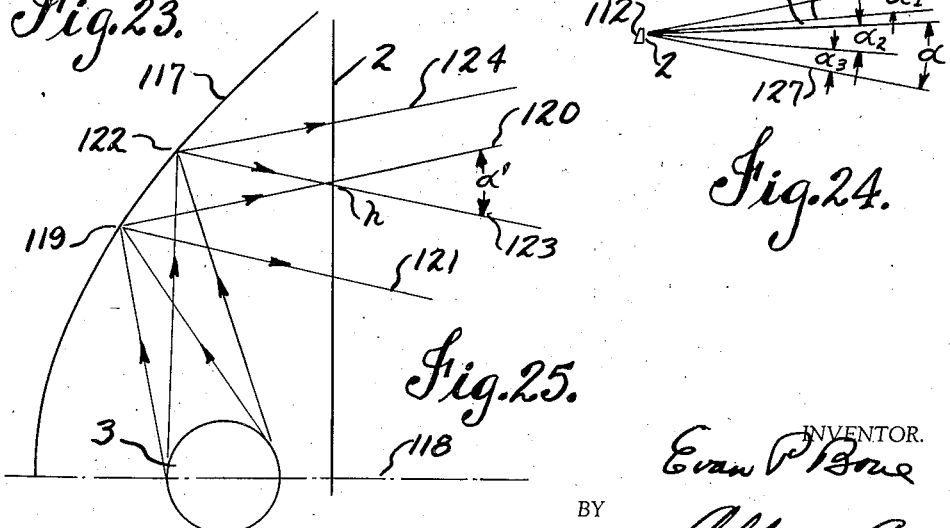

Patented Apr. 21, 1936

2,038,409

UNITED STATES PATENT OFFICE 2,038,409

DISPLAY SIGN

Evan P. Bone, Cincinnati, Ohio, assignor to The Magnilite Sign Corporation, Cincinnati, Ohio, a corporation of Ohio Application August 24, 1931, Serial No. 558,854

15 Claims. (Cl. 40—133)

This invention relates to improvement in electrically luminous display signs.

An object of the invention is to provide optical means for throwing the light out from the sign face, directly toward the locations where those who will observe the sign are located. A further object is to accomplish a conservation of light with optical means so that there will result a material net saving in sign cost when figured on the basis of the intensity exposure to observers. Other objects will appear throughout the specification.

Under existing economic conditions of highly specialized vocations, each individual has become so dependent upon what others produce that better ways and means of knowing where he can have his wants and needs fulfilled seems imperative. Signs as guides in showing what can be bought and where to get it render a valued service toward this end. Electrically luminous signs, which are independent of sunshine and which concentrate light with even more effectiveness than the natural sunlight, have an important role to play in distinctive advertising. Further, the fulfillment of man's satisfaction in adorning his objects of utility, such as streets and buildings, with beauty and associations pleasing to his sensibilities, may be enhanced by a more efficient use of electricity in sign illumination, so that signs are not an unsightly adjunct but have a serious architectural value.

The use of electric signs, particularly by smaller merchants, is now limited by reason of the cost of electricity consumed and of the equipment necessary to transform the electricity into light. Notwithstanding this, signs in general use at the present time waste the bulk of their light by scattering it in all directions. Most of the light goes up into the sky and down on the sidewalk to perform no useful purpose.

In overcoming this waste the present invention comprises astigmatic like optical means for directing the light radiating from the sign within the limits of a predetermined angular range which is narrow vertically but relatively broad horizontally. Since people who view the sign are usually located over the surface of the ground, this condensed range covers the locations where people who will observe the sign usually are located. The optical means employed is a lens, a curved reflector or their combination, having in vertical plane, a specific focal relation between points all over the face of the sign and the source of light. These focal relations are not provided in horizontal planes, at least not with accuracy.

Thus the desired narrow vertical but relatively broad horizontal angular range is obtained by an optical system which I have designed and which is simple to manufacture because the optical relations and accuracy of curves are maintained only in a vertical plane. While it is common practice to use optically focused devices for projecting signals and the like, they are usually of a more complicated nature having focal relations both vertically and horizontally and have only a restricted area of signal not sufficient for a sign face. The natural method of making signs with a horizontal row of letters to form words, requiring a sign face which is elongated horizontally, is particularly adaptable to the present invention as an unlimited increase in the length of sign presents no additional focusing difficulties.

In the accompanying drawings, Fig. 1 represents a vertical elevation and Fig. 2, a plan view, of the sign in relation to the angular range throughout which the sign is to be viewed.

Fig. 3 is a vertical cross-section of the sign using a lens means and showing the fundamental optical principles.

Fig. 4 is a horizontal section taken on plane X—X of Fig. 3.

Fig. 5 shows a horizontal section of another lens modification but having the same vertical section of Figure 3.

Fig. 6 is a vertical cross-section of the sign using a reflector means and showing the optical principles.

Fig. 7 is a horizontal section taken on plane Y—Y in Figure 6.

Fig. 9 shows another modification of the auxiliary means in cross-section.

Fig. 12 shows a horizontal section having incandescent lamps as the source of light.

Figs. 13 to 20 are diagrammatic views showing the geometric relations of parts of the sign.

Figs. 21 and 22 are cross-sections showing the two component mathematical essentials for the optical means.

Fig. 23 shows the geometric essentials of a practical design.

Fig. 24 illustrates in diagram the spread of rays from several reflected images.

Fig. 25 shows the optical relations of a parabolic reflector used in the sign.

Figure 8:
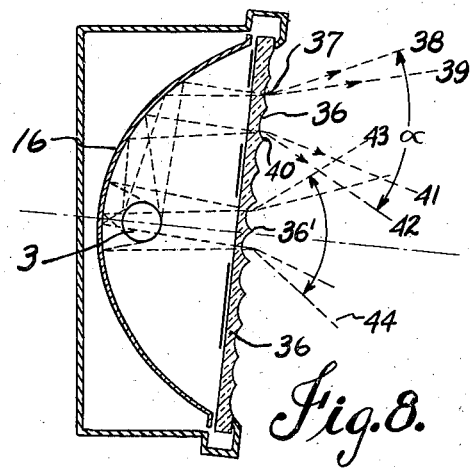
Fig. 8 is a vertical cross-section of a sign having auxiliary optical means.

Referring to the several figures for illustrating the objects of this invention and the means by which they are accomplished, Figs. 1 and 2 show the predetermined angular range within which rays of light from the sign face are projected. In the vertical plane as shown in Fig. 1 the light radiates from a point 4 in the face 2 of the sign 1 within the angular range 5, 6. The level or slightly downward ray 5, would reach persons on the level ground at far distances, and the ray 6 reaches the eye of a person 7 who is standing on the ground reasonably close to the sign where he could look up with comfort to read it. This relatively narrow condensed range between 5 and 6, requires only a small fraction of the light for brightness equivalent to that of usual signs which scatter their light throughout 180 degrees. The rays 8 and 9, shown in dotted lines, are typical of those rays which are not intensified, the former going down toward the sidewalk and the latter going up into the sky. The view in Fig. 2 shows the light radiating from the point 4 within the range of 10 and 11. This wide range adequately covers persons located over the surface of the ground at such typical positions as are indicated at 12 and 13.

The range of rays radiating from another point 14 on the sign face 2 is shown by the broken lines to be parallel to those from point 4 and to cover essentially the same range, because the distance from which the sign is viewed is relatively large as compared to the dimensions of the sign face, particularly the height. It is an important feature of this invention that the light is radiated within the desired predetermined range from points anywhere on the sign face. This is distinct from such optical means as are in common use at the present and which may project light within angular ranges of small height and large width but in which the light to any typical location comes from no particular part on the front face of the device.

By confining the light thrown out from the sign face to within useful angular ranges, the large saving is effected in the vertical plane as only about one-tenth as much light is needed as compared to the usual signs which scatter their light throughout the entire 180 degrees. In horizontal planes the saving is not so marked because the sign may be normally viewed from wide side angles, as may be noted from Fig. 2, so the provision of optical means with definite focal relations to accomplish this saving is well worth while in the vertical plane but is not of so much moment in a horizontal plane.

The fundamental optical focal relations of the system inside the sign 1 which is used for projecting the light within the condensed vertical range as desired are shown in Figs. 3 and 6. The complete sign is made up of optical units which can be standardized and which are adapted for quantity manufacture. In each of the modifications shown in Figs. 3 and 6 the sign is made up of two units, each unit comprising a source of light 3 and associated condensing means. In Fig. 3 the condenser in each unit is a convex lens 15 and in Fig. 6 its optical equivalent a concave reflector 16. In the following description the sign will be considered as of one unit, since the optical means are merely duplicated in other units of the same sign.

The sign characters are formed on the sign face 2 by blocking out the portions which are to appear dark and leaving spaces clear which are to appear bright. The light interrupting material 17 for blocking out the letters, may be either light absorbing, light reflecting to send the intercepted rays back into the sign, or light diffusing to dim the light by scattering the rays in all directions. The clear spaces 18 let the light go straight through the face, with no material scattering except as for such refractions as are part of the optical systems.

The light source 3 in Fig. 3 is located at the principal focus of the condensing lens 15. In accordance with well known laws of optics the light is projected outwardly from a typical point 19, on the sign face in a pencil within an angle of spread 20, 21, whose axis is parallel to the axis of the lens and which is equal to the angle at 19 subtended by the source of light 3. Likewise the light from any other point 23 is projected in a pencil of light rays whose axis is essentially parallel to that of the pencil 20, 21, because the source 3 is at the principal focus of the lens 15.

Similar optical relations hold for the reflective means 16 shown in Fig. 6. The light from any point 24 in an opening in the sign face is thrown out in a pencil of rays within an angle 25, 26 which is determined by the angle subtended at the point 24 by the source 3, measuring along the optical path and accounting for the curvature of the reflector.

These two Figs. 3 and 6 show the fundamental optical means used in vertical planes for condensing the projected light within the narrow vertical range as desired for sign requirements and making it possible to use a single source of light for rendering the entire face luminous throughout the corresponding unit.

In Fig. 4, showing a horizontal view of the lens sign of Fig. 3, the source of light 3 is shown elongated in the horizontal plane. A pencil of light rays are projected from any point such as 27 in the sign face within the wider angular range 28, 29 which is determined by the dimensions of 3 in accordance with the laws of optics as noted above. It is not so essential to maintain these focal relations as it was in the vertical plane because the wide range gives more leeway. In fact, the curvature of the lens 15 may vary so that its principal focus in horizontal plane would not fall within the source of light 3, thus constituting an astigmatic lens, provided the source of light is sufficiently elongated so that the light from points all over the face covers the minimum angular range notwithstanding some overlapping.

In Fig. 5, showing also a horizontal section of another modification which goes a step further and which has the same vertical cross-section as shown in Fig. 3, the front lens 30 has no curvature in horizontal plane and the source of light 3 is longer than the sign face 2. Light projected from any point 31 will cover a wide horizontal angular range 32, 33 as determined directly by the source of light 3.

Fig. 7 showing a horizontal section of the reflector modification whose vertical section is shown in Fig. 6 has reflected means all made up of straight lines in horizontal cross-section. The source of light 3 extending the length of the sign face is reflected by the main reflector 16 and also by the end reflectors 34, 34 to form the resultant images shown partially by the dotted lines. The image 35 has infinite length and the light projected from any point on the face 2 has also an infinitely wide horizontal range to reach any side positions from which the lettering of the sign could be read.

It is not always practicable to cover the desired vertical range by the fixed size of the source of light and its distance from the optical surfaces as explained above, because of the difficulty of getting a source of light (or associated light emitter of uniform brightness) which is sufficiently large in proportion to a practical height of sign unit. That is, while the optical means are used for condensing the range vertically, it is often desirable to modify or temper the degree to which this condensation is carried. Auxiliary means are provided in the modification shown in Fig. 8 to fulfill this requirement. The natural spread of the light as established by the said dimensions, is augmented by the small diverging lenses spaced adjacently across the face as shown by 36, 36, etc. These diverging lenses 36 are preferably of a size which is near the limits of visual acuity of the eye for distances from which the sign is designed to be viewed, or at least so close together that they form characters of desired visual continuity. The pencil of light from any point 37 near the top of a diverging lens 36 is refracted upwardly within the angle 38, 39; instead of going straight ahead parallel with the parobola axis, as in previous modifications. The pencil of light rays from a point 40 near the bottom of the same diverging lens 36 is refracted downwardly as shown by 41, 42. Thus while the angle 38, 39 and the angle 41, 42 are each determined by the size of the source of light 3 and its optical distances from their respective points, the total vertical spread is increased to the angular range 38, 42.

The curvature of a diverging lens near the center as shown by 36' has preferably a shorter radius than the divergers near the edges. The purpose of this is to give the pencil of rays from the center a little excess spread as shown by 43, 44 over that actually required to cover the desired angular range, so that the brightness of the sign face will appear uniform. Since the optical distance from the source of light to the sign face is less in the center than it is near the outer edges, the sign face would appear brighter in the center than near the edges if the curvatures of the diverging lenses were not made to compensate for this.

This compensation for making uniform brightness from the top to the bottom of the sign face is automatically provided for in modifications as shown in Figs. 3 and 6, where the vertical spread is determined by the focusing of the complete unit. As noted in Fig. 3 the central point 23 is nearer the source of light 3 than is the outer point 19 and consequently the spread of the pencil of rays from 23 is proportionately greater than the spread from point 19 as shown by angle 46, 47. This just compensates, in accordance with well known optical principles, to maintain the same brightness at 19 as at the point 23 which is closer to the source. In speaking of the condensed vertical spread, that at the edge is considered, it being understood that the more central points can have a little excess spread merely to compensate for their excess brightness.

If the divergers were made of flat sections on the reflector, each of equal height, as shown in Fig. 23, the compensation for brightness would also be taken care of.

This compensation for uneven brightness as caused by varying distances from the source of light does not necessarily means an even brightness in the photometric sense in that the sign face must have equal lamberts of brightness at the center as at the edges. Since the eye, following Weber's law, partially compensates within itself for the variations in brightness, this extra spreading of light from a central diverger is carried to such an extent as is necessary to obtain satisfactorily uniform effect as seen by the eye.

This spread of light as caused by the diverging lenses 36, is entirely different in effect from such a spread as would occur by placing the source of light slightly out of focus of the condenser. For instance if in Fig. 3 the source of light 3 were placed slightly forward, the out of focus effect would decrease the condensation but this would be done by bodily raising the pencil 20, 21 coming from the top point 19 and lowering a corresponding pencil from the bottom of the face. This would cause parts of the face to become dark according to the particular location of the observer. It is essential as shown in Fig. 8, to have a condenser or light directing system such as a parabolic reflector 16 with the source of light 3 at its principal focus and to have superimposed across the reflector or other condenser the smaller optical system or divergers for augmenting or tempering the spread as desired. Thus the angular range is increased over and above that which it would be from the natural source of light from points throughout the extent of the sign face. Many optical devices are well known for projecting their beam of light within definite fields and within angular ranges which have a width greater than their height but the present invention projects the light within such definite fields from points all over the extent of the sign face.

The divergers can, instead of concave lenses, be convex lenses of proper focal length, as shown in Fig. 9. The convex lens in Fig. 9 converges the rays to near its principle focal point 48 at which the rays cross and then diverge into the spread angle α. For the purpose of a display sign we are only concerned with distances relatively far in front where the said rays are diverging. While a convex lens is usually classed as a converging lens, it serves as a diverger for our purposes when its luminous object point is in general, twice the focal length or more back of the lens. Likewise, if reflecting means are used, they may be either concave or convex. The term "diverger", used throughout these specifications and claims, may be either a concave or convex lens, or, concave or convex reflector, or any combination of the same, but when the term is used in connection with a convex lens, or a concave reflector, certain focal relations, above specified, are also implied.

Figure 11:
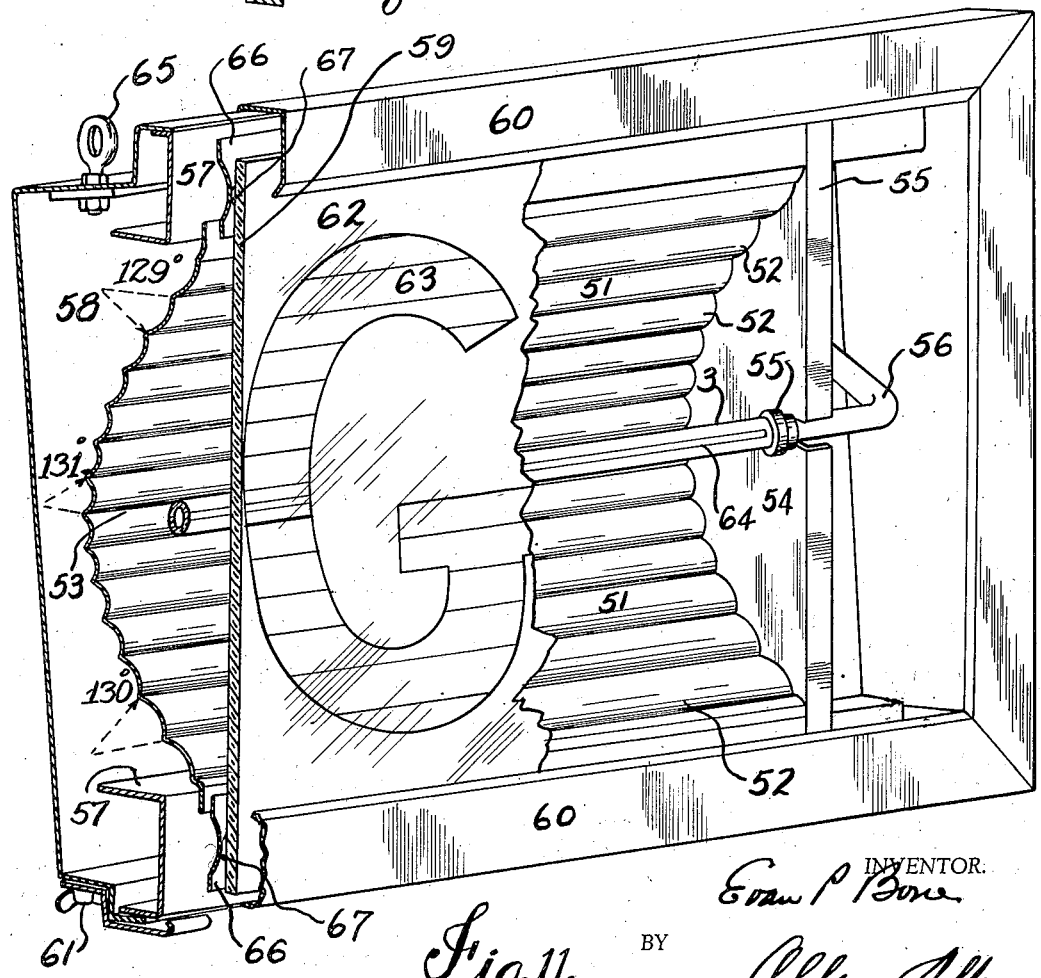
Fig. 11 is a perspective view, with parts broken away, showing the structural details and having a luminous tube for the source of light.

The condensers and divergers can be separate means as in Fig. 8 or they may be combined on the same surface as shown in Fig. 11, and hereinafter explained. When the two light directing means are combined, the surfaces can be considered, for the purpose of description and analysis, to be resolved into their their component optical parts comprising condensers and divergers.

The axis of the optical system in all modifications is disposed at such an angle with reference to the hanger and sign housing inclosing the optical system that the projection of light in beams is directed slightly downwardly, because the signs are usually hung at an elevation above normal observers of the sign. This is shown by several of the figures of the drawings, for instance Figs. 3 and 10.

Figure 10:
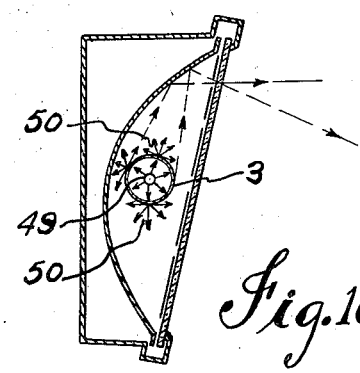
Fig. 10 shows a vertical cross-section of the sign using an auxiliary light emitter.

Instead of an original source of light, for instance, a filament heated to incandescence electrically, or a gas rendered luminous electrically, an auxiliary light emitter can be employed. In Fig. 10, a small light source of any kind is represented by 49. Surrounding this is a tube 3 preferably circular in vertical cross section. Light radiating in all directions from the source 49 strikes the inner surface of 3 and emerges from the outer surface in scattered rays 50 as shown. The auxiliary light emitter 3 is translucent or transparent with a roughened or diffused surface to scatter rays in a manner like the original light source. Calculations and designs for the optical systems are made as though the light source has the dimensions of 3. The frosted bulb of a standard incandescent electric lamp is a light emitter of this character. In carrying out the essentials of this invention all surfaces which either reflect or refract the light from the effective light emitting surface 3, on through the openings in the sign face, are polished surfaces so that the laws of reflection and refraction obtain. The difference between a diffusing surface which scatters light in all directions and a polished surface is not understood to be finished necessarily by the act of polishing but to be that any irregularities on the surface have a height less than one fourth the wave length of a light ray, while diffusing surfaces have irregularities upon them which are greater. The distinction is important for this invention and in reflection is often distinguished by the terms specular reflection and diffuse reflection.

Fig. 11 shows, with structural details, a modification which I have found practical to manufacture. In this case the source of light is a horizontal neon gas or other luminous tube 3. The main optical system is the reflector 51 made of sheet metal polished and plated with silver or chromium to give a high factor of light reflection. The condenser or reflector 51 is in the form of a parabola in vertical cross-section with the source of light 3 in its focus. Superimposed upon the reflector 51 are a plurality of elements or divergers 52, 52, etc. Each of these adjacent divergers 52 are segments of a circle in vertical cross-section, the radii of their curvature gradually shortening toward the vertex 53 of the parabola. The dotted lines 129 and 130 indicate respectively radii of ridges near the outer edges of the reflector 51. The dotted line 131 indicates the shorter radius of the ridges near the vertex of the parabola. There is a plane reflector 54 at each end of the sign unit, this combination of reflectors forming the optical function in horizontal planes, the same as shown in Fig. 7. The reflector 51 with the diverging ribs 52 can be formed in a continuous process by passing the blank sheet metal lengthwise through rolls, which method is particularly favorable to low cost manufacturing. A bushing 55 of soft material, preferably insulating, fits in the end reflector 54 and softly supports the tube source of light 3 in proper focal position. The ends of the tubes are bent at 56 as indicated, so that the electrodes can easily be slipped into electrical connection. A supporting frame of a formed metal channel 57 and end plates support the reflector with tube and also the transformer and other electrical connections (not shown) which are behind the reflector. The entire working unit or chassis is slipped into the box or housing 58 which is preferably made of light metal. The sign face is a glass sheet 59 which may be held by clips in the frame 60 and which also serves as a moulding for the sign. The box and moulding at the top are formed to keep out rain and are locked together at the bottom by lugs and thumb nuts 61. Thus the moulding with the glass is easily detachable for the replacement of tubes or sign copy. The characters or letters are formed by blocking out with a coating of paint 62 or the like, to leave openings 63 in the clear glass and through which the light passes. The rear coating of paint 62 is preferably white or some light reflecting surface so that the light intercepted at the blank spaces is returned to the reflector and utilized. The characters can be formed in like manner by cutouts in a sheet of non-translucent paper clamped in place behind the glass. The tube 3 has a strip or shield 64 directly in front of it for intercepting the light so that the direct light from the tube will not molest the evenness of brightness from the reflector. This shield 64 may have a light reflecting surface at its back. The hanger 65 is placed relative to the center of gravity of the complete sign so that the main optical axis of the system will be inclined downwardly according to the height at which the sign is designed to be hung. A strip 66 of sheet spring metal is attached to the channel 57 to act as a weather strip behind the glass. A soft gasket 67 may also be placed behind the glass to protect it from breakage and also serve as a seal to protect the polished surfaces of the reflector and tube from dust and moisture.

Fig. 12 shows a modification similar to that of Fig. 11 except that a row of concentrated light sources 68, 68, 68, etc. such as incandescent electric lamps are placed along the focus of the main optical system. The elements 69, 69, etc. are vertical ribs or flutes on the front glass, for spreading the light in horizontal planes so that the light sources will appear to merge as one elongated source of light. In front of each source 68, is a shield 45 to intercept the direct light.

To enable those skilled in the art who may design signs to take advantage of the conservation of light as accomplished by this invention, the necessary focal relations are specified in the following mathematical formulæ. There are two essential problems—one, to direct the light from a common source more or less squarely against all parts of the face of the unit, and the other to arrange the optical parts so that this light is thrown out from locations all over the sign face to conform to the predetermined angular range. The second of these two essentials is shown first.

While in this invention it is a feature that any elementary area in the display face of the sign may be made luminous, so that any combination of characters or any design can be displayed by merely blocking out the parts of the display face which are to be dark, yet these elementary areas may have appreciable size without molesting the evenness of tone or interrupting the appearance of continuity in the characters displayed. This is on account of the limits of visual acuity of the eye which phenomenon is noted for example from the fact that a half tone picture, composed of dots and lines, appears as of even tones when viewed from proper distance. Signs viewed from a distance of 60 feet and having elementary light areas spaced ¼" apart, appear as a solid mass of light. It has been a custom in sign practice to tolerate considerable lack of continuity by tracing out characters with incandescent lamps having considerable spacing between them or by having luminous tubes to show the mere skeleton or outline of the characters. This method is hardly consistent with the refinements of the preferred modification of this invention but in general the elementary areas must be smaller at least than the strokes of the characters to be displayed. The term strokes has been adopted from the sign painters art to indicate the individual brush strokes used in painting a sign. The elementary area may be an auxiliary optical unit or merely an imaginary area of the sign face of definite size as fixed by the visual acuity.

The light thrown out from a single typical elementary area of sign face is shown in Fig. 13 where the sign face is represented by the numeral 2 and the elementary area by a hole through the said opaque sign face between the points 70 and 71. The arrow 72 represents some luminous object or source of light spaced a distance $l$ back of the sign face. The overall size of the luminous object in the plane of the paper is $a$ and that of the elementary area is $h$. The luminous object $a$ would be visible to an eye located at any typical position within the boundary lines 74 and 75 of the angle of spread $\alpha$. To an observer at 73 the elementary area $h$ would appear luminous between the points 76 and 77. At another location within the spread angle $\alpha$, another part of the area of $h$ would be luminous, but assuming the observer to be at normal distance this difference would be imperceptible and it is of no consequence from which part of $h$ the light is coming. The value of the spread angle $\alpha$ can be determined by considering the geometry of the Fig. 13 to be approximately $$\tan \frac{\alpha}{2} = \frac{a+h}{2l} \quad (1)$$

The lines 74 and 75 are the extreme limits of spread angle $\alpha$ but from the lines 78 and 79 outwardly the apparent brightness of the area $h$ would diminish in accordance with the well known umbra and penumbra effect. But if $a$ is either several times larger or smaller than the value of $h$, this effect is negligible for practical sign purposes.

Referring to Fig. 14, the angular range within which the sign is designed to be observed is represented by the angle $\omega$ and the angle of spread $\alpha$ must include the angular range $\omega$, but for the sake of economy should not be materially greater than $\omega$. The bisector or axis of the angle $\omega$ is shown by the line 80 and the line 81 drawn through the centers of $a$ and $h$ is the axis of the angle of spread $\alpha$. The angle of inclination between the said two axes is represented by $\delta$ and the required value of $\alpha$ can be determined by the formula $$\alpha = 2\delta + \omega \quad (2)$$

If the angle of spread in the above Formula (1) is not as large as that required from Formula (2), an auxiliary optical element or diverger is then placed in front of $a$ to alter its apparent size and location. This diverger may be a concave or convex lens, a concave or convex mirror or any combination of the same with the focal length proportioned to cause the rays of light to diverge, in accordance with well known laws of optics. The one chosen for illustration is a concave lens 82 as shown in Fig. 15. To an observer out in front and looking into the lens 82, the light coming from the luminous object $a$ would appear as though coming from the location shown at $b$, this being the optical image of the luminous object $a$ of such size and location as can be determined by the well known laws of optics. The angle of spread is now increased to the lines as shown and is expressed by the formula approximately $$\tan \frac{\alpha}{2} = \frac{b+h}{2l} \quad (3)$$

$b$ taking the place of $a$ in Equation (1). The designer can make the curvature of the diverger 82 such as to give it the proper focal length to make the image $b$ of such size and location to secure the proper angle of spread $\alpha$.

It very often occurs that there are various stops, usually due to the boundaries of the optical surfaces themselves or to the inclined positions at which they are placed. Fig. 16 shows stops 83 and 84 to limit the portion of $b$ which lies in the field of $h$. In this event the effective dimensions 85, 86 and 87, 88 are taken respectively for $b$ and $h$ in Equation (3). The effective values of $b$ and $h$ can be determined from the geometry of the layout because they depend solely upon the relative sizes and positions of the parts.

The complete solution for calculating the dimensions of the optical surfaces necessary to cover the desired range angle $\omega$ for a luminous body of length $a$ at a fixed distance behind an elementary area of sign face of definite dimension $h$ is now shown in the following paragraph making reference to Fig. 17.

The proportion between a luminous object $a$ and its image $b$ is in accordance with the laws of lenses and curved mirrors.

$$\frac{b}{q} = \frac{q}{p} \text{ or } b = \frac{qq}{p} \quad (4)$$

where $p$ and $q$ are respectively the distances of object and image from the principal point or optical center 89 of the lens 82. Substituting the value of $b$ from Equation (4) in Equation (3)

$$\tan \frac{\alpha}{2} = \frac{\frac{aq}{p} + h}{2l} \quad (5)$$

Designating the distance from diverger 82 to the sign face as $s$, $l = q + s$, this Equation (5) becomes $$\tan \frac{\alpha}{2} = \frac{\frac{aq}{p} + h}{2(q+s)} \quad (6)$$

Solving for $q$ in this equation, we have $$q = \frac{p\left(h - 2s \tan \frac{\alpha}{2}\right)}{2p \tan \frac{\alpha}{2} - a} \quad (7)$$

Substituting the value of $\alpha$ from Equation (2), $$q = \frac{p\left(h - 2s \tan \frac{2\delta + \omega}{2}\right)}{2p \tan \frac{2\delta + \omega}{2} - a} \quad (8)$$

Making use of the familiar dioptic formula for lenses and curved mirrors, $$\frac{1}{q} - \frac{1}{p} = \frac{1}{f} \quad (9)$$

where $f$ is the focal length of the diverger 82, using due regard to the positive or negative signs as to whether or not it is used for concave or convex lens or reflector, putting this Equation (9) in the form $$f = \frac{pq}{p-q} \quad (10)$$

and substituting in this equation, the value of $q$ from Equation (8) and reducing, the focal length is $$f=\frac{p\left(h-2s \tan \frac{2\delta+\omega}{2}\right)}{2(p+s) \tan \frac{2\delta+\omega}{2} - (a+h)} \quad (11)$$

The Equation (11) is a perfectly general formula for determining the focal length of any auxiliary optical lens or mirror required to redirect with best economy and efficiency the light emanating from any element on the sign face to within the desired angular range.

Very often the optical auxiliary element itself forms the sign element $h$, in which case the distance $s$ is zero and the focal length becomes $$f=\frac{ph}{2p \tan \frac{2\delta+\omega}{2} - (a+h)} \quad (12)$$

If the light has just the correct amount of spread before it reaches the display face, the denominator of Equation (12), which may be expressed in the form $$\tan \frac{2\delta+\omega}{2} - \frac{a+h}{2p}$$

becomes zero and the focal length $f$ becomes infinite. This means that the front surface is a plane surface.

The auxiliary optical elements or divergers are used to produce more spread where desired, and any spread produced by surfaces or otherwise, preceding the surface under consideration, must be less than the final spread desired. This means that the Equation (11) is not applicable unless the expression $$\tan \frac{2\delta+\omega}{2} > \frac{a+h}{2p}$$

is also satisfied. The Formula (11) or (12) can of course, be used for any polished surface other than the last surface intercepted.

Figure 18:
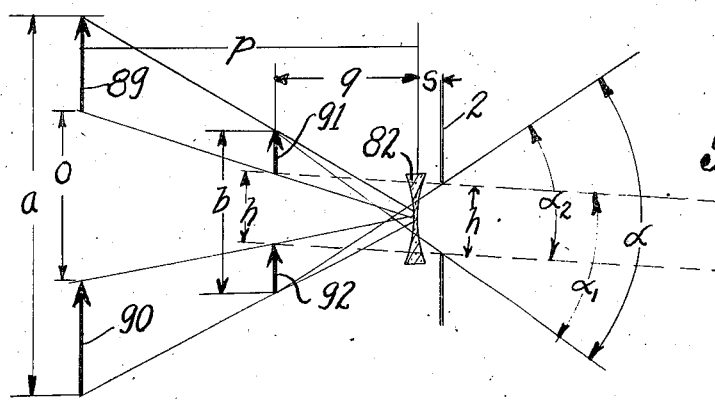

The luminous object back of the element $h$ may be broken up into a plurality of separate objects. Fig. 18 shows two luminous objects 89 and 90. In this case the focal length of the lens 82 is made such as to form images at 91 and 92, the overall dimension of which forms the dimension $b$ in the Formula (3), to obtain the desired spread $\alpha$. That is, the overall height of all images in the field, instead of the height of a single image, should be placed for $b$ in the formula. However, the spacing between the individual images of the total imagery must not be greater than the height $h$ of the elementary face area. The spacing between the images 91 and 92 of the figure is made equal to $h$. The individual spread from the image 91 is $\alpha_1$, and that from the image 92 is $\alpha_2$. The inside rays of the angles $\alpha_1$, and $\alpha_2$ are parallel and would merge together to form the boundary between the individual spreads at a distance ahead which is large as compared to the height $h$. The total spread angle $\alpha$ equals $\alpha_1$, plus $\alpha_2$. In calculating the dimensions to give a desired spread $\alpha$ from an imagery made up of a plurality of separate images the formula $$o < \frac{ph}{q} \quad (13)$$

must also be satisfied, where $o$ is the maximum space between any two adjacent objects in the field of elementary area $h$.

Lenses or curved mirrors are usually the arcs of circles in cross-section and such are here preferred for the auxiliary elements because they produce the same value of brightness for all locations from which the sign is designed to be viewed throughout the angular range. However, auxiliary elements having certain deformed surfaces deviating somewhat from circular arcs but which produce practical results and come within the spirit and intent of this invention may be used. Such deformed surfaces may not only produce the image $b$ of varying brightness but may split the image up into separate parts. In such cases the parts of the image are considered as an imagery as treated above and the rule must be followed that the spacing between each part of the imagery is not greater than $h$, the size of an elementary face area. An auxiliary element varying from a true lens may be made up for instance of a polygon in cross-section. In all such cases the lens formulæ which have been made use of would apply only approximately. In fact, the common formulæ for lenses and spherical mirrors are only approximations for other than paraxial rays even with spherical surfaces, but it is common practice to use them notwithstanding the errors due to aberrations. Likewise these lens formulæ are applied to the present problem although it is to be understood that they represent approximations, but these approximations are sufficiently close for predetermining the dimensions of a practical sign.

In the foregoing general expressions the light which enters an elementary area $h$ has been considered as coming from a luminous object. It was shown how, by the proper focal relations specified in Equation (11) the light can be spread throughout any desired angle to suit the size and position of the said luminous object wherever that may be. If the luminous object is not squarely behind the element $h$ the angle of inclination $\delta$ becomes large with consequent waste of light. Now, as a matter of fact, $a$ is not actually a luminous object but another image of a luminous object farther back. The other essential of this invention, now considered, is to direct the light from the actual source common to the entire unit to each of the various elementary areas located all over the sign face, by means of a system of polished surfaces or condensers with a view of keeping the angle of inclination $\delta$ as low as possible to economize the light wherever there is an advantage in doing so; that is, where the saving in light offsets any additional cost of the optical surfaces, and this usually applies to the vertical plane.

Figure 19:
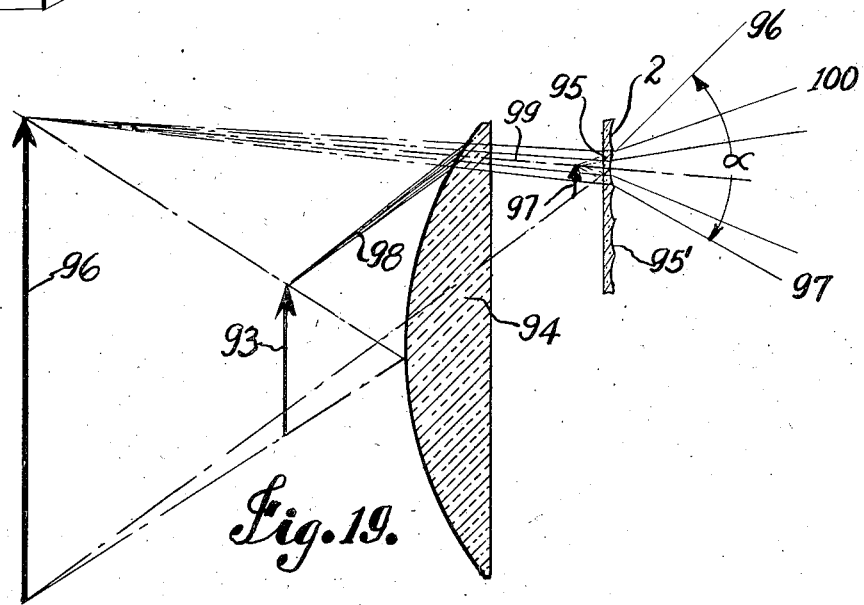

In the diagrammatic view of the sign unit shown in Fig. 19 the actual source of light is represented by the arrow 93 and the sign face by 2. The large condensing lens 94, is used to direct the light from the light emitter 93 more squarely against the face 2, where the auxiliary elements 95, 95, etc. are located to produce the desired spread 96, 97 from each element, the focal relations of the said element 95 having just been discussed. The main directing system 94 produces at 96 an image of the luminous source 93 in accordance with the laws of optics. This image 96, which is more squarely back of the sign face than the original luminous source 93, now becomes the luminous object relative to the auxiliary element 95 which in turn forms its image at 97 as previously discussed. A pencil of rays from the upper point of the arrow 93 passing through the element 95 may be traced at 98 and 99 and finally spreading into the angle of 100 and 97.

Figure 20:
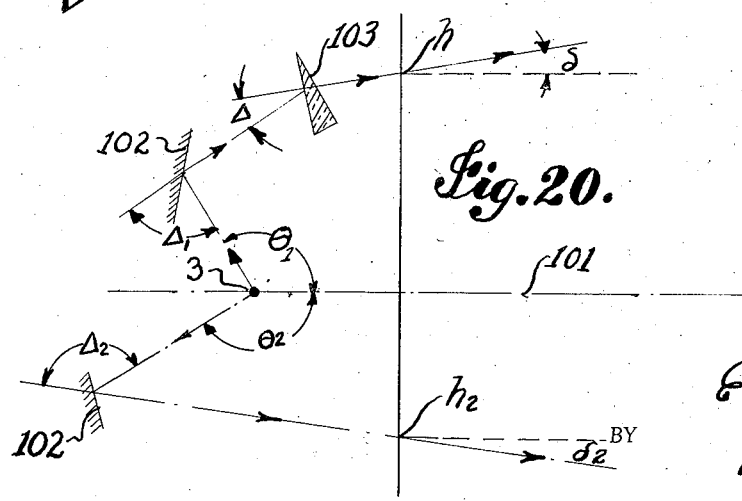

The more squarely the main directing system 94 places its image 96 behind all parts of the sign face, the smaller will be angles of inclination $\delta$. The perfectly general case of the main directing system for determining the value of the angle of inclination $\delta$ is shown diagramatically in Fig. 20 where 3 is the common source of light and typical elementary areas are represented at $h_1$ and $h_2$. The two chief or central rays of the bundles of rays which go from the source of light to each of the elementary areas are shown leaving the source at respective angles $\theta_1$ and $\theta_2$ with the axis 101 of the angular range. The angles $\theta$ are measured from the front. These rays change direction upon striking a plane reflector surface as 102 or passing through a prism as 103. Each angle of deviation $\Delta$ of the rays at any polished surface can be calculated from known constants by well known laws of optics. Calling $\Sigma\Delta$ the sum of the angles of deviation which the ray makes at each surface, it is noted from the geometry of the figure that $$\delta = \theta - \Sigma\Delta \qquad (14)$$

The complete solution for designing the optical system to take advantage of the economies of this invention is made by fulfilling the two essentials of first keeping the value of $\delta$ from Formula (14) as near zero as expedient and second, providing the proper angle of spread $\alpha$ as shown in Equation (11).

Surfaces may be disposed at angles and with curves to perform both functions of angular directing and of spreading, but for the purposes of defining this invention such surfaces can be mathematically resolved into their component parts. Fig. 21 shows an elementary area $h$ in the sign face 2 which is to receive its light from the luminous area 104, and project it outwardly within the angle $\omega$ whose axis 105 is perpendicular to the sign face. Across the area $h$ is placed a concave lens 106 with its optical center at 107 so as to form an image 108 of the luminous object 104. The focus of the lens 106 and its optical center 107 are such that the image 108, relative to the elementary area $h$ spreads the light within the angle $\alpha$ which coincides with the angle $\omega$. Thus the lens 106 performs the double role of changing the angle of direction of a bundle of rays and also of spreading them. For the purpose of defining this invention however, the lens 106 can be considered as made up, as shown in Fig. 22 of a prism 109 and a concave lens 110 with its optical center centered with the elementary area. In this case the prism 109 would form an image at 111 of the luminous area 104. Then 111 would become the object for the lens 110 which then forms its image at 108 giving the same angle of spread $\alpha$ as shown in Fig. 21.

The design of a practical structure is shown in Fig. 23. The sign face 2 with a typical elementary area $h$ has to its rear a luminous source 3. A directing system or condenser 112 is made up of a plurality of plane reflectors 113, 113, 113, etc. Each of these reflectors or divergers 113 is set at an angle to form its respective image 114, etc. directly behind it so as to reflect the light directly toward and generally perpendicular to the sign face. The height of each mirror 113 is made equal to the height of an elementary area $h$ plus the diameter of the source. This makes the spacing between the images 114 just equal to the height of element $h$. Each image 114 must of course be seen in its corresponding mirror. As indicated by lines 115 and 116 only a portion of the image $114_1$ is in the field of $h$. The entire image $114_2$ in its corresponding mirror is in the field of all parts of the element $h$. The image $114_3$ in its corresponding mirror $113_3$, is barely in the full field of $h$ as shown by the connecting lines. The spread of the light thrown out from $h$ from the image $114_1$ is shown by the angle $\alpha_1$; that from the image $114_2$ by $\alpha_2$; and that from the images $114_3$ by the angle $\alpha_3$. Since the spacing between the images 114, etc. is equal to the height of element $h$ the angle of spread from each image would join together at distances ahead which are large in comparison with $h$. However, if the images are not completely in the field of $h$, as is the case with image $114_1$, there will be a dark place to limit the total spread. Fig. 24, showing the spread to a smaller scale shows that there is a dark gap between $\alpha_1$ and $\alpha_2$ and the total spread angle would be limited between the lines 126 and 127, the beam $\alpha_1$ between 115 and 116 being disconnected and disregarded. Other images such as $114_4$ have no concern with the particular elementary face area $h$ because they are completely out of its field. This example shows the practical use of the main directing system or condenser and also shows how the imagery made up of several images determinates the angle of spread.

If the segments 113 of the reflector 112 were made infinite in number and the sign requirement of throwing the light forward in general parallel directions were maintained, the reflector would take the form of a parabolic curve as shown by 117 in Fig. 25. The pencils of rays from the luminous source 3 striking the reflector anywhere on its surface are projected forward in pencils with axes parallel to the axis 118 of the reflector, providing the center of the source is at the focus of the parabola. The pencil of rays striking the reflector at 119 is reflected forward between the rays 120 and 121. The pencil from the source 3 striking the reflector at 122 is reflected forward within the lines 123 and 124. The elementary area $h$ receives its light from points on the reflector between 119 and 122 and the resultant angular spread $\alpha$ is that made by the intersection of the lines 120 and 123. Because the point 119 is nearer the source 3 than the point 122, the ray 120 has a little more slope than the ray 123 so that the angle $\delta$ is not actually zero but sufficiently small for practical purposes of the best concentration. Only that part of the image in the reflector lying between 119 and 122 is within the field of the elementary area $h$.

The main directing system or condenser as shown in the various figures has in vertical plane a curvature correcting for spherical aberration. When reflecting means are used the parabola is such a curve. When refracting means are used glass can be saved by the use of a Fressnel lens as shown by the dotted line 125 of Fig. 3.

In the design and construction of the sign the aperture or the front opening of the optical system is made at least as large as the display face or the unobstructed openings therein. All surfaces which the light intercepts between the light emitter and display face, either reflecting or refracting, are polished surfaces, so that the optical laws regarding angles of incidence and emergence will obtain. Surfaces which have the characteristics of part polished and part diffuse may be used where the preponderance of the light rays follow the said optical laws, to conform to the spirit and intent of this invention, to conserve and economize the available light.

The linear dimensions of the light emitter are made smaller than the display face in vertical plane perpendicular to the sign face. The curves or angles of the polished surfaces in the horizontal plane are made so as to be easy to calculate and to construct. For the condensing means, a reflector is preferable to a lens because it surrounds the source to catch and utilize more of the light.

It will be apparent that optical elements are used in this invention for a different function than is usual in the art of artificial illumination. In the usual process of seeing under artificial light, the light source throws out rays of light which strike the object which is to be seen. The surface of the object then reflects the light in all directions, a minute proportion of which goes in the direction of the eye. It is common practice to economize light by the use of condensers such as reflectors or lenses to redirect the light radiating from the source and to concentrate it toward the object to be seen. The surface of the object, receiving more light, then reflects more light in all directions including the direction of the eye and the object appears brighter to the observer. The present invention differs from this practice. The light is concentrated on the object to be seen which in the present instance is in the display face. The light is then further redirected from the object to be seen toward normal positions of the eye. This effects a further saving.

The condenser in this invention is used to direct and concentrate the light rays upon the sign face over its entire extent. The divergers are then used to further fix the angles of spread of the intensified emergent light rays to cover and only cover typical positions of the eye of the observer. To accomplish this with efficiency the divergers have a geometrical relation with the condenser and the source of light. Sometimes the proper spread is secured by providing the co-relations between the source of light and the condenser without the aid of the divergers, as fully explained both descriptively and mathematically.

The term "clear openings" used in some of the claims is intended to mean that the opening is, free from opaqueness, transparent with polished surfaces, unobstructed, or free from anything which blurs or materially scatters the light; as when the letters on the sign face are made of clear glass or when the sign face is cut away entirely to leave unobstructed openings.

The definition of the word "fix" is intended to be taken as to establish, to implant, or to make definite.

Having thus described my invention, what I claim as new and desire to secure by Letters Patent is:

1. A sign having a display face with clear openings therein forming characters, a light emitter, a light condenser having a polished surface, said emitter being at the focus of said condenser, and a series of light divergers, having polished surfaces, superimposed across said light condenser, said emitter and said condenser being relatively positioned to condense the angular spread of the rays emerging from said openings, to substantially fit a predetermined angular range; said divergers being small relative to the widths of the character strokes designed to be displayed, and so formed as to diverge the light from all small areas of said openings on the display face to every point in said predetermined range.

2. A sign having a display face with clear openings therein forming characters, a light emitter, a light condenser having a polished surface, said emitter being at the focus of said condenser, and a series of light divergers, having polished surfaces, superimposed across said light condenser, said emitter and said condenser being relatively positioned to condense the angular spread of the rays emerging from said openings, to substantially fit a predetermined angular range; said divergers being small relative to the widths of the character strokes designed to be displayed, and the curvatures of said divergers being more pronounced near said light emitter to equalize the brightness over the display face.

3. A sign having a display face with clear openings therein forming characters, a light emitter, a light condenser having a polished surface, said emitter being at the focus of said condenser in a vertical plane, and a series of light divergers, having polished surfaces, superimposed across said light condenser, said emitter and said condenser being relatively positioned in a different optical co-relation for vertical plane than for horizontal plane, to condense the angular spread of the rays emerging from said openings, to substantially fit a predetermined angular range which is smaller in vertical plane than in horizontal plane; the heights of said divergers being small relative to the widths of character strokes designed to be displayed, so as to diverge a ray of light from every point on said display face to every point in said range.

4. A sign having a display face with clear openings therein forming characters, a light emitter, a light condenser having a polished surface, said emitter being at the focus of said condenser in a vertical plane, and a series of light divergers, having polished surfaces, superimposed across said light condenser, said emitter and said condenser being relatively positioned in a different optical co-relation for vertical plane than for horizontal plane, to condense the angular spread of the rays emerging from said openings, to substantially fit a predetermined angular range which is smaller in vertical plane than in horizontal plane; the heights of said divergers being small relative to the widths of character strokes designed to be displayed, and the curvatures of said divergers being more pronounced near said light emitter to equalize the brightness over the display face.

5. A sign having a display face with clear openings therein forming characters, a light emitter, a parabolic reflector having a polished surface, said emitter being at the focus of said reflector, and a series of light divergers, having polished surfaces, superimposed across said reflector, said emitter and polished surfaces being relatively positioned to condense the angular spread of the rays emerging from said openings, to substantially fit a predetermined angular range; said divergers being small relative to the widths of character strokes designed to be displayed, and so constructed as to diverge the light from every point on said display face to every point in said range.

6. A sign having a display face with clear openings therein forming characters, a light emitter, a parabolic reflector having a polished surface, said emitter being at the focus of said reflector in vertical plane, and a series of light divergers, having polished surfaces, superimposed across said reflector, said emitter and polished surfaces being relatively positioned in a different optical co-relation for vertical plane than for horizontal plane, to condense the angular spread of the rays emerging from said openings, to substantially fit a predetermined angular range which is smaller in vertical plane than in horizontal plane; the heights of said divergers being small relative to the widths of character strokes designed to be displayed, and constructed to direct a ray of light from every point on said display face to every point in said range, but not out of said range.

7. A sign having a display face adapted to be partially blocked out with light interrupting material to leave clear areas forming the desired characters, a light emitter and light deflecting means having polished surfaces arranged to throw out light in predetermined angular ranges from elementary areas over the extent of the face, each of said elementary areas being small relative to the widths of the character strokes which the sign is designed to display, the said elementary areas which are farthest from the said light emitter, having the relations substantially defined by the formula $$f = \frac{p\left(h - 2s \tan \frac{2\delta + \omega}{2}\right)}{2(p+s) \tan \frac{2\delta + \omega}{2} - (a+h)}$$

where the symbol $f$ is the optical focal length of the last surface intercepted by the light which reaches said elementary areas, $\omega$ the desired angular range throughout which the sign is designed to be viewed, $h$ the size of said elementary area, $s$ the distance from said elementary area to said last polished surface, $a$ the size and $p$ the distance from said surface of the locality from which the rays are coming when striking said surface, said locality being determined by the position and size of the light emitter and any other intervening polished surfaces, and $\delta$ the angle of inclination defined by the equation $\delta = \theta - \Sigma\Delta$, the symbol $\theta$ being the angle with the axis of $\omega$ which the central ray makes when leaving the light emitter and $\Sigma\Delta$ the sum of the angles of deviation at each surface intercepted; all surfaces intercepted successively by the central ray of the bundle of rays in its travel from the light emitter to said elementary area being set at angles to make $\delta$, in the vertical plane perpendicular to the sign face, small relative to $\omega$.

8. A sign having a display face adapted to be partially blocked out with light interrupting material to leave clear areas forming the desired characters, a light emitter and light deflecting means having polished surfaces arranged to throw out light in predetermined angular ranges from elementary areas over the extent of the face, each of said elementary areas being small relative to the widths of character strokes which the sign is designed to display, the said elementary areas which are farthest from said light emitter, having the relations substantially defined by the formula $$f = \frac{p\left(h - 2s \tan \frac{2\delta + \omega}{2}\right)}{2(p+s) \tan \frac{2\delta + \omega}{2} - (a+h)}$$

where the symbol $f$ is the optical focal length of the last surface intercepted by the light which reaches said elementary areas, $\omega$ the desired angular range throughout which the sign is designed to be viewed, $h$ the size of said elementary area, $s$ the distance from said elementary area to said last polished surface, $a$ the size and $p$ the distance from said surface of the locality from which the rays are coming when striking said surface, said locality being determined by the position and size of the light emitter and any other intervening polished surfaces, and $\delta$ the angle of inclination defined by the equation $\delta = \theta - \Sigma\Delta$, the symbol $\theta$ being the angle with the axis of $\omega$ which the central ray makes when leaving the light emitter and $\Sigma\Delta$ the sum of the angles of deviation at each surface intercepted; all surfaces intercepted successively by the central ray of the bundle of rays in its travel from the light emitter to said elementary area being set at angles to make $\delta$, in the vertical plane perpendicular to the sign face, small relative to $\omega$, and the angular range $\omega$ being greater in horizontal plane than in vertical plane.

9. A sign having a display face adapted to be partially blocked out with light interrupting material to leave clear areas forming the desired characters, a light emitter and light deflecting means having polished surfaces arranged to throw out light in predetermined angular ranges from elementary areas over the extent of the face, each of said elementary areas being small relative to the widths of the character strokes which the sign is designed to display, the said elementary areas which are farthest from the light emitter, having the relation substantially defined by the formula $$f = \frac{p\left(h - 2s \tan \frac{2\delta + \omega}{2}\right)}{2(p+s) \tan \frac{2\delta + \omega}{2} - (a+h)}$$

where the symbol $f$ is the focal length of the last surface intercepted by the light which enters said elementary area, $\omega$ the desired angular range throughout which the sign is designed to be viewed, $h$ the size of said elementary area, $s$ the distance from said elementary area to said last polished surface, $a$ the size and $p$ the distance from said surface of that imagery which is the field of said elementary area and $\delta$ the angle of inclination defined by the equation $\delta = \theta - \Sigma\Delta$, the symbol $\theta$ being the angle with the axis of $\omega$ which the central ray makes when leaving the light emitter and $\Sigma\Delta$ the sum of the angles of deviation at each surface intercepted, said imagery having substantially the relation $$o < \frac{ph}{q}$$

where $o$ is the spacing between the independent images which make up said imagery; all surfaces intercepted successively by the central ray of the bundle of rays in its travel from the light emitter to said elementary area being set at angles to make $\delta$, in the vertical plane perpendicular to the sign face, small relative to $\omega$.

10. A sign having a display face adapted to be partially blocked out with light interrupting material to leave clear areas forming the desired characters, a light emitter and light deflecting means having polished surfaces arranged to throw out light in predetermined angular ranges from elementary areas over the extent of the face, each of said elementary areas being small relative to the widths of character strokes which the sign is designed to display, the said elementary areas which are farthest from the light emitter, having the relation substantially defined by the formula $$f=\frac{p\left(h-2s\tan\frac{2\delta+\omega}{2}\right)}{2(p+s)\tan\frac{2\delta+\omega}{2}-(a+h)}$$

where the symbol $f$ is the focal length of the last surface intercepted by the light which enters said elementary area, $\omega$ the desired angular range throughout which the sign is designed to be viewed, $h$ the size of said elementary area, $s$ the distance from said elementary area to said last polished surface, $a$ the size and $p$ the distance from said surface of that imagery which is in the field of said elementary area and $\delta$ the angle of inclination defined by the equation $\delta=\theta-\Sigma\Delta$, the symbol $\theta$ being the angle with the axis of $\omega$ which the central ray makes when leaving the light emitter and $\Sigma\Delta$ the sum of the angles of deviation at each surface intercepted, said imagery having substantially the relation $$o<\frac{ph}{q}$$

where $o$ is the spacing between the independent images which make up said imagery; all surfaces intercepted successively by the central ray of the bundle of rays in its travel from the light emitter to said elementary area being set at angles to make $\delta$, in the vertical plane perpendicular to the sign face, small relative to $\omega$, and the angular range $\omega$ being greater in horizontal plane than in vertical plane.

11. An illuminated sign having a transparent front panel with opaque means forming an outline design therein, a source of light within the sign and reflecting means against which rays of light impinge, arranged for reflecting rays throughout a wide range as to one dimension of the front panel of the sign and a narrow range as to another dimension of said panel, said reflecting means comprising a series of parallel curved reflectors extending widthwise of the sign, said reflectors being of greater curvature along the medial widthwise line of the reflecting means.

12. A sign having a display face with clear openings therein forming characters, a light emitter and a light condenser, having polished surfaces, said light emitter being of such size that together with the condenser it will project rays of light in a plurality of directions from every point on said display face but within a predetermined angular range.

13. A sign having a display face with clear openings therein forming characters, a light emitter of an appreciable given size, and a light condenser having polished surfaces, said emitter being at the focus of said condenser in a vertical plane, said size of said emitter being such that with the condenser the rays of light projected from every point on said display face will fit and cover a predetermined angular range which is smaller in the vertical plane than in the horizontal plane.

14. In combination with a parabolic reflector, a transparent sign face, and a light source, said light source having an emitting surface of substantial extent transversely of said reflector so as to project light to any given point on said reflector from a plurality of effective directions and thereby to produce an area of diffused illumination, so that for the points on said reflector farthest from said light source the breadth of said light source being in proportion to the breadth of said transparency, as the distance of said light source from said reflector is to the distance of said transparency from said reflector, whereby to confine said area of diffused illumination substantially to the area of said transparency.

15. In combination with a parabolic reflector, a transparent sign face, and a light source having an emitting surface of appreciable size so as to project light from a plurality of points on said surface and to thereby produce a predetermined area of diffused illumination, so that for the points on said reflector farthest from said light source the breadth of said light source being in proportion to the breadth of said transparent sign face, as the distance of said light source from said reflector is to the distance of said transparent sign face from said reflector, whereby to confine said area of diffused illumination to the area of said transparent sign face.

EVAN P. BONE.